(12) United States Patent
Chun

(10) Patent No.: US 11,262,950 B2
(45) Date of Patent: Mar. 1, 2022

(54) MEMORY SYSTEM FOR ADJUSTING DIFFERENCE BETWEEN OPERATION TIME POINTS IN SEQUENTIAL COMMAND OPERATIONS PERFORMED IN MEMORY DEVICE, AND OPERATION METHOD THEREOF

(71) Applicant: SK hynix Inc., Icheon (KR)

(72) Inventor: Dong Yeob Chun, Icheon (KR)

(73) Assignee: SK hynix Inc., Icheon (KR)

( * ) Notice: Subject to any disclaimer, the term of this patent is extended or adjusted under 35 U.S.C. 154(b) by 29 days.

(21) Appl. No.: 16/940,056

(22) Filed: Jul. 27, 2020

(65) Prior Publication Data

US 2021/0303209 A1   Sep. 30, 2021

(30) Foreign Application Priority Data

Mar. 24, 2020  (KR) .......................... 10-2020-0035469

(51) Int. Cl.
*G06F 3/06* (2006.01)
(52) U.S. Cl.
CPC .......... *G06F 3/0659* (2013.01); *G06F 3/0614* (2013.01); *G06F 3/0625* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| 2012/0204056 A1* | 8/2012 | Airaud | G06F 21/75 713/401 |
| 2017/0098937 A1* | 4/2017 | Huomo | H02J 3/386 |
| 2021/0271412 A1* | 9/2021 | Cheong | G06F 3/0656 |

FOREIGN PATENT DOCUMENTS

| KR | 101772592 B1 | 8/2017 |
| KR | 20190052884 A | 5/2019 |

* cited by examiner

*Primary Examiner* — Charles Rones
*Assistant Examiner* — Jonah C Krieger

(57) ABSTRACT

A memory system containing: a nonvolatile memory device including a plurality of memory dies that each perform a plurality of command operations, and a controller configured to: store, in a preset internal space, profile information for changes in power consumption for each of a operation sections included in each of the command operations, check, from the profile information, the changes in power consumption for each operation section of a first and second command when sequentially propagating the first and second command to the memory dies, calculate, based on the checked changes in power consumption for each operation section, a maximum length of an overlap operation section between the first and second command in which peak power is maintained at or below a first reference power, and adjust, a difference between time points for performing the first and second command based on the calculated maximum length of the overlap operation section.

20 Claims, 11 Drawing Sheets

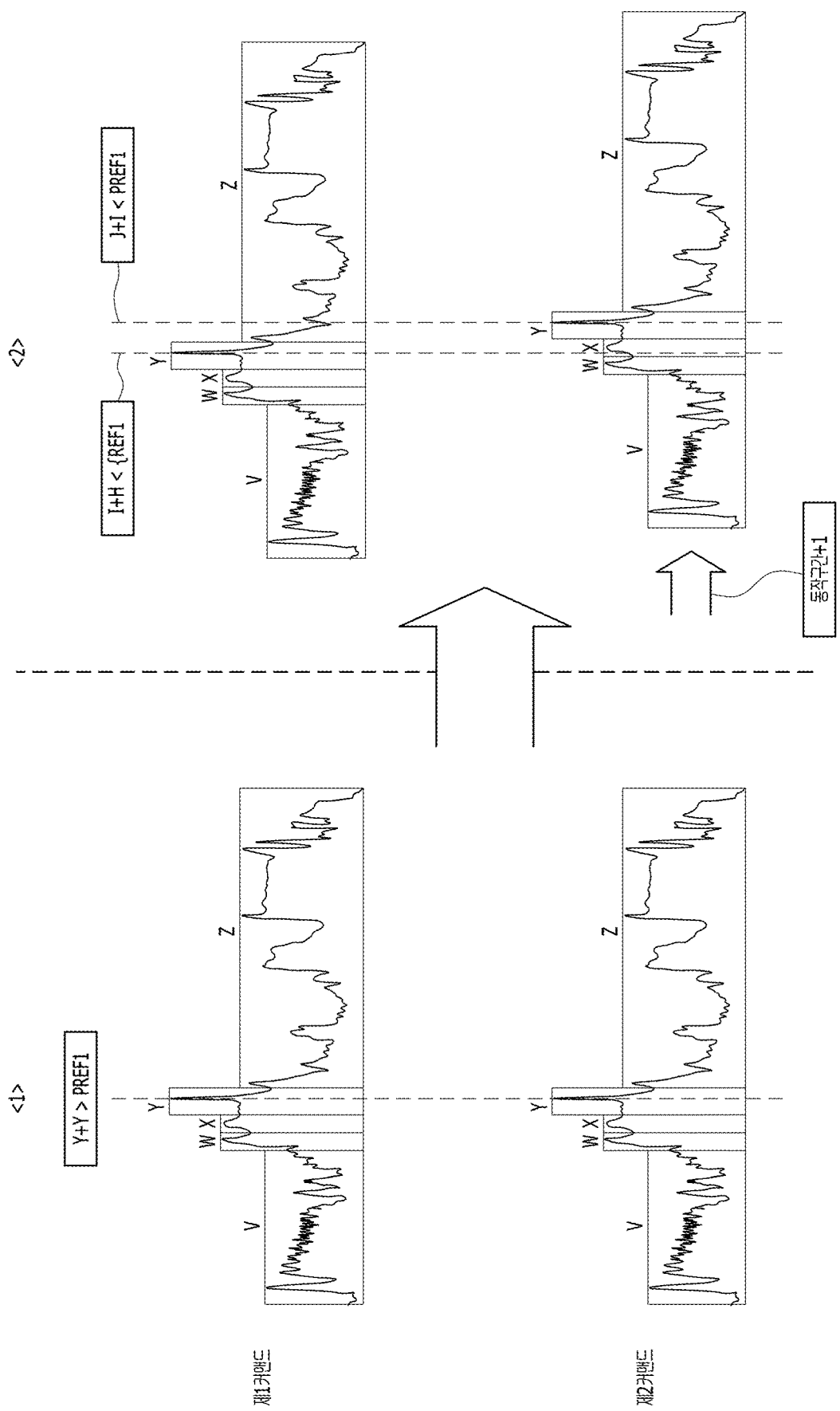

MEMORY SYSTEM FOR ADJUSTING DIFFERENCE BETWEEN OPERATION TIME POINTS IN SEQUENTIAL COMMAND OPERATIONS PERFORMED IN MEMORY DEVICE, AND OPERATION METHOD THEREOF

CROSS-REFERENCE TO RELATED APPLICATION

This application claims priority under 35 U.S.C. § 119 to Korean Patent Application No. 10-2020-0035469 filed on Mar. 24, 2020, which is incorporated herein by reference in its entirety.

BACKGROUND

1. Field

Embodiments relate to a memory system, and more particularly, to a memory system including a plurality of memory devices and an associated method of operation.

2. Discussion of the Related Art

Recently, a computer environment paradigm has shifted to ubiquitous computing, which enables a computer system to be accessed virtually anytime and everywhere. As a result, the use of portable electronic devices, such as mobile phones, digital cameras, notebook computers and so on, has grown. Such portable electronic devices typically use or include a memory system that includes or embeds at least one memory device, e.g., a data storage device. The data storage device can be used as a main storage device or an auxiliary storage device of a portable electronic device.

For a computing device, a data storage device benefits from using a nonvolatile semiconductor memory device because the device has excellent stability and durability due to the lack of no mechanical driving part (e.g., a mechanical arm in a hard disk) and can exhibit high data access speeds and low power consumption. Example data storage devices include a universal serial bus (USB) memory device, a memory card having various interfaces, and/or a solid state drive (SSD).

SUMMARY

Various embodiments are directed to a memory system and associated method that can accurately adjust a difference between time points when two or more commands are performed, in order to minimize power used when the two or more commands are performed and when the two or more commands are sequentially propagated to a plurality of memory devices included in the memory system.

In an embodiment, a memory system may include: a nonvolatile memory device including a plurality of memory dies that each perform a plurality of command operations in response to a plurality of commands; and a controller. The controller may be configured to: store, in a preset internal space of the controller, profile information for changes in power consumption for each of a plurality of operation sections included in each of the plurality of command operations; check, from the profile information, the changes in power consumption for each operation section of a first command and a second command when sequentially propagating the first command and the second command to the plurality of memory dies; calculate, based on the checked changes in power consumption for each operation section, a maximum length of an overlap operation section between the first command and the second command in which peak power is maintained at or below a first reference power for the nonvolatile memory device; and adjust, a difference between time points for performing the first command and the second command based on the calculated maximum length of the overlap operation section.

The plurality of operation sections included in each of the plurality of command operations may be selected based on fixed time intervals set between a start point and an end point for each of the plurality of command operations.

The plurality of operation sections included in each of the plurality of command operations may be selected based on a plurality of specific time points determined by comparing a magnitude of power, used between a start point and an end point of each of the plurality of command operations, to a second reference power.

A maximum power used in each of the plurality of operation sections included in each of the plurality of command operations may be set as power consumption for each operation section in the profile information.

The controller may adjust a length of an overlap operation section between the first command and the second command by: varying a number of overlap operation sections between the first command and the second command using an overlap prediction operation of varying changes in power consumption for each operation section of the first command and the second command; and checking the changes in power consumption for each overlap operation section using the profile information stored in the preset internal space of the controller.

The controller: may perform a comparison operation to compare one or more added powers for the one or more overlap operation sections between the first command and the second command to the first reference power; and may determine, based on the comparison operation, whether at least one of the added powers is greater than the first reference power.

Before sequentially propagating the first command and the second command to the plurality of memory dies, the controller may alternately and repeatedly perform the overlap prediction operation and the comparison operation until a preset condition for the memory device is satisfied.

The controller may start the overlap prediction operation and the comparison operation when a maximum number of overlap operation sections occur between the first command and the second command. The preset condition may be based on a state of the memory device when no added power is greater than the first reference power.

The profile information may be stored in one or more memory dies of the plurality of memory dies. The controller may load the profile information from the plurality of memory dies and stores the loaded profile information in the preset internal space during a booting operation of the memory system.

The memory system may further include: an additional nonvolatile memory device in which the profile information is stored. The controller may load the profile information from the additional nonvolatile memory device and stores the loaded profile information in the preset internal space, during a booting operation of the memory system.

In an embodiment, a method of operating a memory system having a nonvolatile memory device including a plurality of memory dies suitable that perform a plurality of command operations in response to a plurality of commands, the method may include: storing, in a preset internal space of the memory system, profile information that identifies changes in power consumption for each of a plurality of operation sections included in each of the plurality of command operations; checking, from the profile information, the changes in power consumption for each operation section of a first command and a second command, when the first command and the second command are sequentially propagated to the plurality of memory dies; determining, from the changes in power consumption, a maximum length of an overlap operation section between the first command and the second command in which peak power is maintained at or lower than a first reference power of the nonvolatile memory device; and adjusting a difference between time points of performing the first command and the second command are performed based on the determined maximum length of the overlap operation section.

The plurality of operation sections included in each of the plurality of command operations may be selected based on fixed time intervals set between a start point and an end point of each of the plurality of command operations.

The plurality of operation sections included in each of the command operations may be selected based on a plurality of specific time points determined by comparing a magnitude of power used between a start point and an end point of each of the plurality of command operations, to a second reference power.

A maximum power used in each of the plurality of operation sections included in each of the plurality of command operations may be set as power consumption for each operation section in the profile information.

The method may further include: adjusting a length of an overlap operation section between the first and second commands by: varying a number of overlap operation sections between the first command and the second command using an overlap prediction operation of varying a change in power consumption for each operation section of each of the first command and the second command; and checking the changes in power consumption for each overlap operation section using the profile information stored in the preset internal space of the controller.

The method may further include: performing a comparison operation to compare one or more added powers for the one or more overlap operation sections between the first command and the second command to the first reference power; and determining, based on the comparison operation, whether at least one of the added powers is greater than the first reference power.

The adjusting step may include: alternately and repeatedly performing the overlap prediction operation and the comparison operation until a preset condition for the memory device is satisfied, before sequentially propagating the first command and the second command to the plurality of memory dies; and adjusting a difference between time points of performing the first command and the second command in response to alternately and repeatedly performing the overlap prediction operation and the comparison operation.

The overlap prediction operation and the comparison operation start when a maximum number of overlap operation sections may be present between the first command and the second command. The preset condition may be based on a state of the memory device when no added power is greater than the first reference power The profile information may be stored in one or more memory dies of the plurality of memory dies. The method may further include: loading the profile information from the plurality of memory dies; and storing the loaded profile information in the preset internal space during a booting operation of the memory system.

The memory system may further include an additional nonvolatile memory device in which the profile information is stored. The operation method may further include: loading the profile information from the additional nonvolatile memory device; and storing the loaded profile information in the preset internal space during a booting operation of the memory system.

In accordance with the present embodiment, when two or more commands are sequentially propagated to the plurality of memory devices included in the memory system, the memory system may check a change in power consumption for each of a plurality of operation sections included in each of the two or more commands which are supposed to be propagated to the plurality of memory devices, by referring to the profile information on a change in power consumption for each of a plurality of operation sections included in each of a plurality of command operations which can be performed in the plurality of memory devices, calculate the maximum length of an overlap operation section between two or more commands, in which peak power can be retained at a reference power or less, by referring to the check result, and adjust a difference in operation time point between the two or more commands according to the calculation result.

Through this operation, the system can accurately adjust a difference between time points when two or more commands are performed, in order to minimize the power used when the two or more commands are performed in the memory device.

BRIEF DESCRIPTION OF THE DRAWINGS

FIG. 9 is a diagram describing a second operation of the controller on a plurality of sequential commands.

DETAILED DESCRIPTION

Figure 1A:
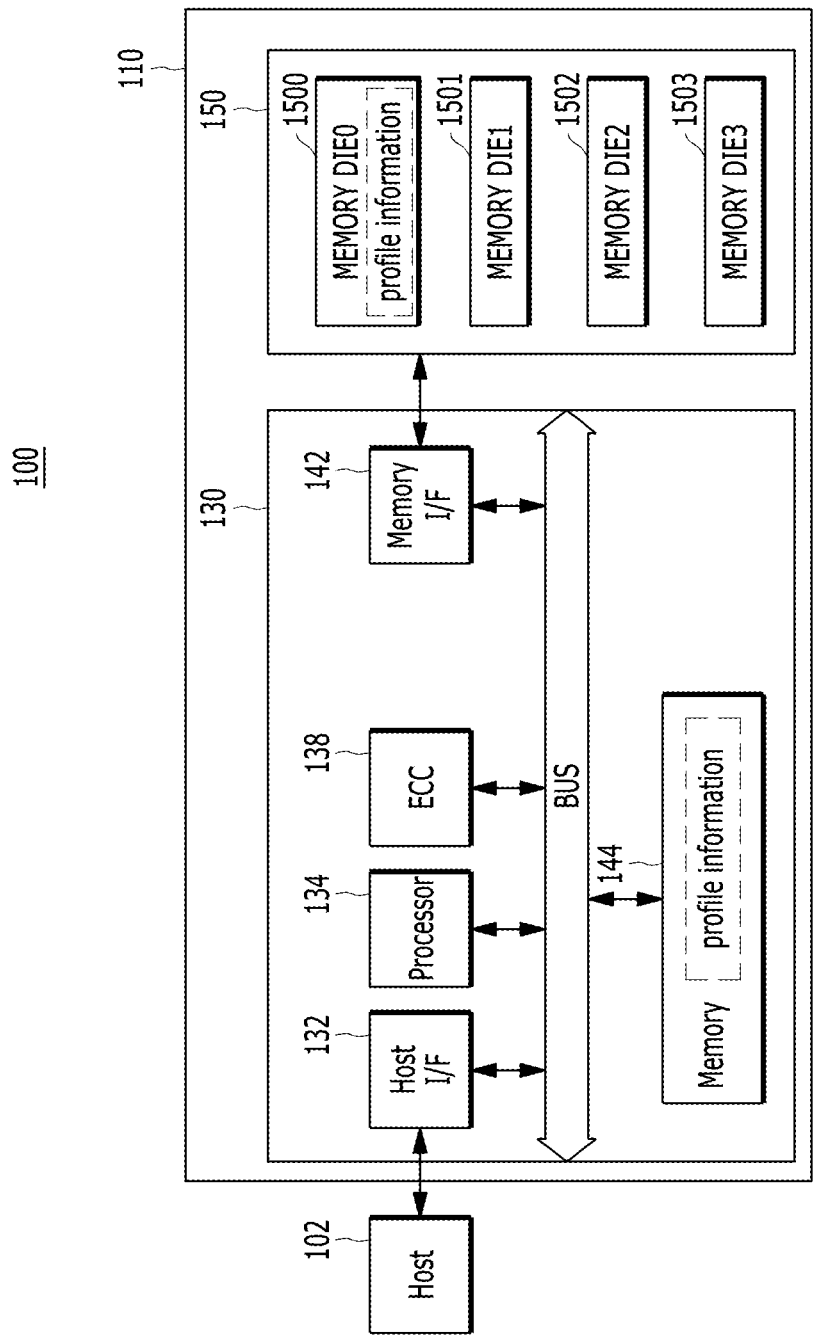
FIGS. 1A to 1C are diagrams illustrating various examples of a data processing system including a memory system in accordance with an embodiment.

Various examples of the disclosure are described below in more detail with reference to the accompanying drawings. Aspects and features of the present technology, however, may be embodied in different ways to form other embodiments, including variations of any of the disclosed embodiments. Thus, the disclosed technology is not to be construed as being limited to the embodiments set forth herein. Rather, the described embodiments are provided so that this disclosure is thorough and complete, and fully conveys the disclosure to those skilled in the art to which the technology pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the technology.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the disclosed technology. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the technology belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the technology. The technology may be practiced without some or all of these specific details. In other instances, well-known process structures and/or processes have not been described in detail in order not to unnecessarily obscure the technology.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

Figure 1B:
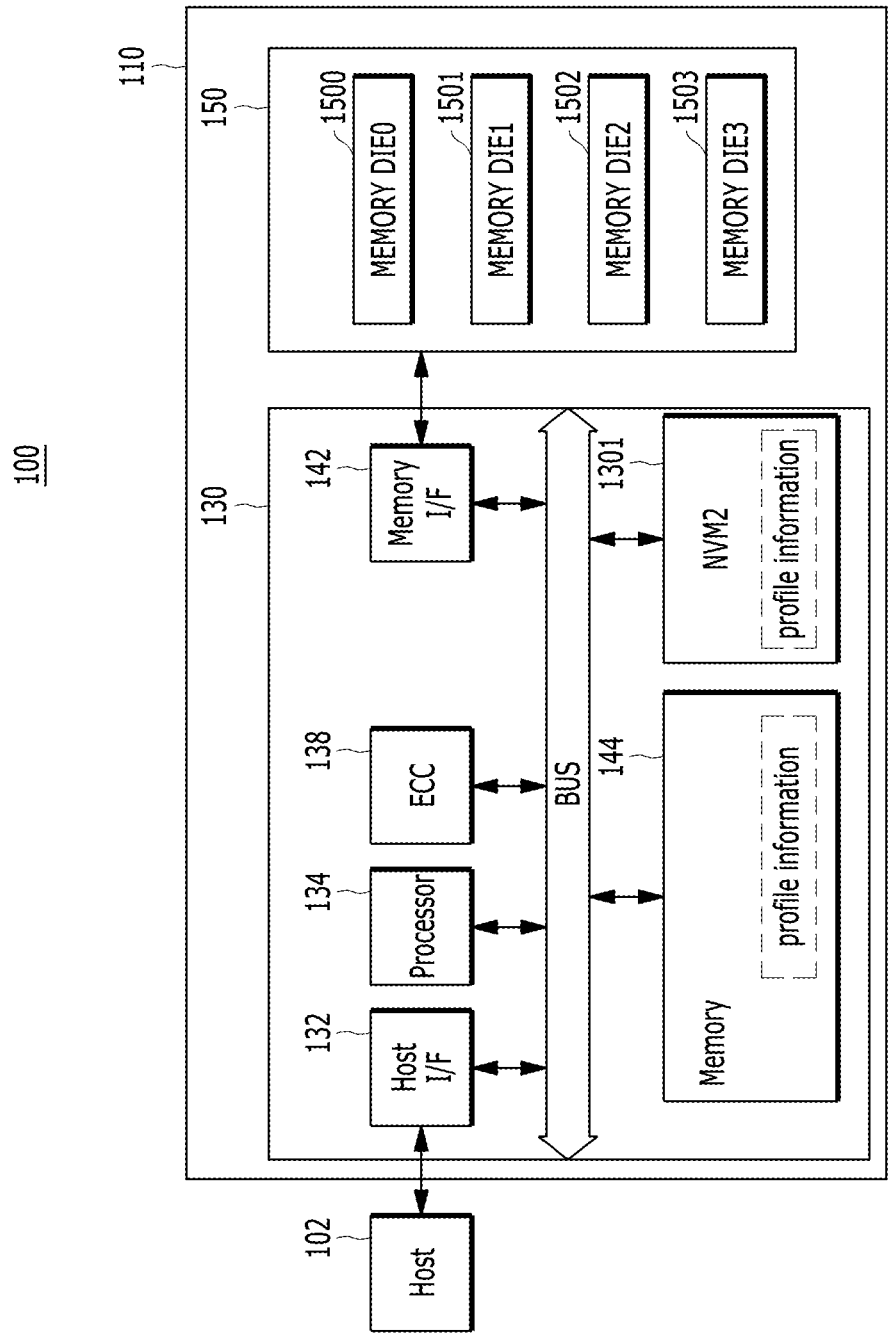
Figure 1C:
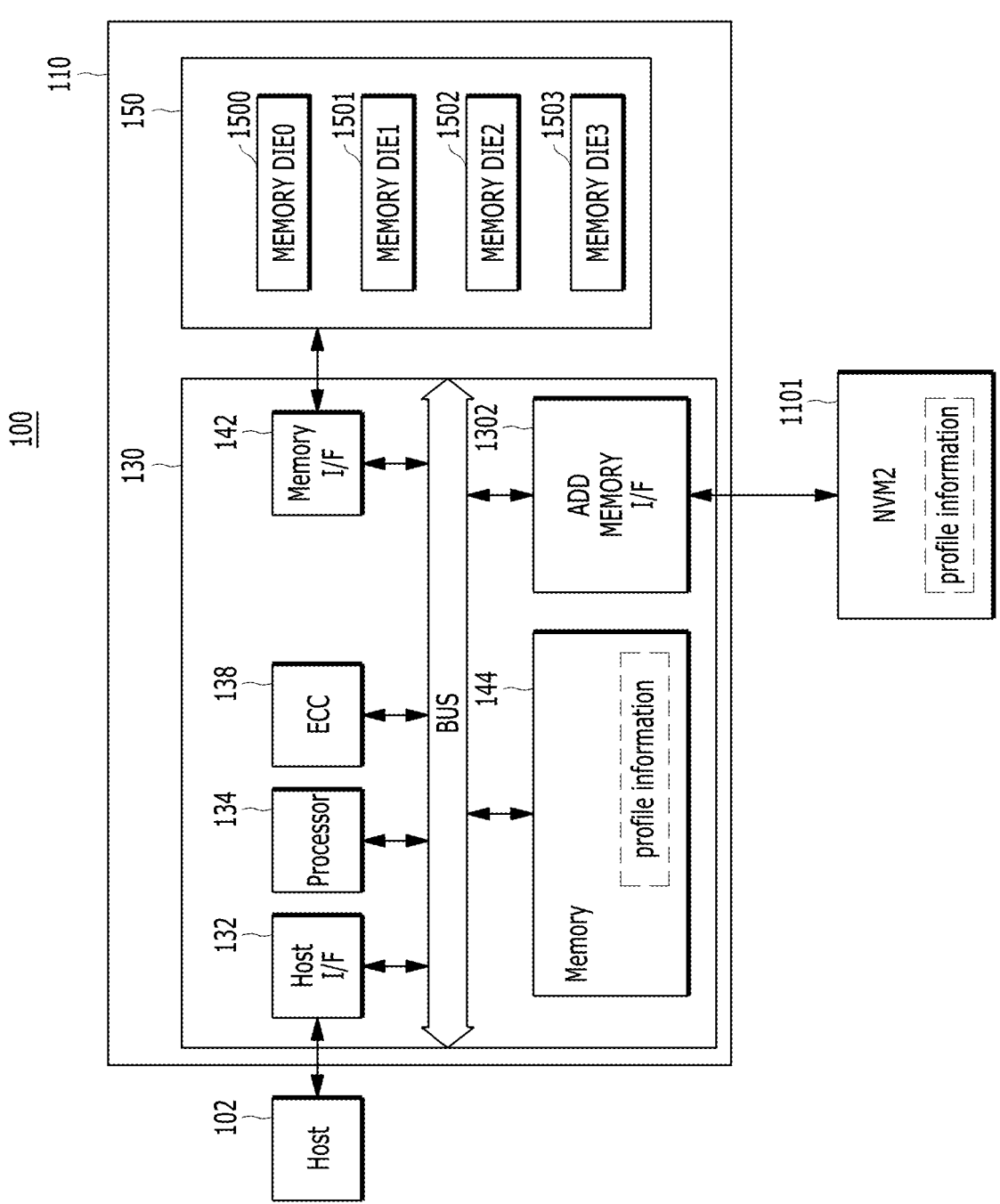

FIGS. 1A to 1C are diagrams illustrating various examples of a data processing system including a memory system in accordance with an embodiment.

Figure 2:
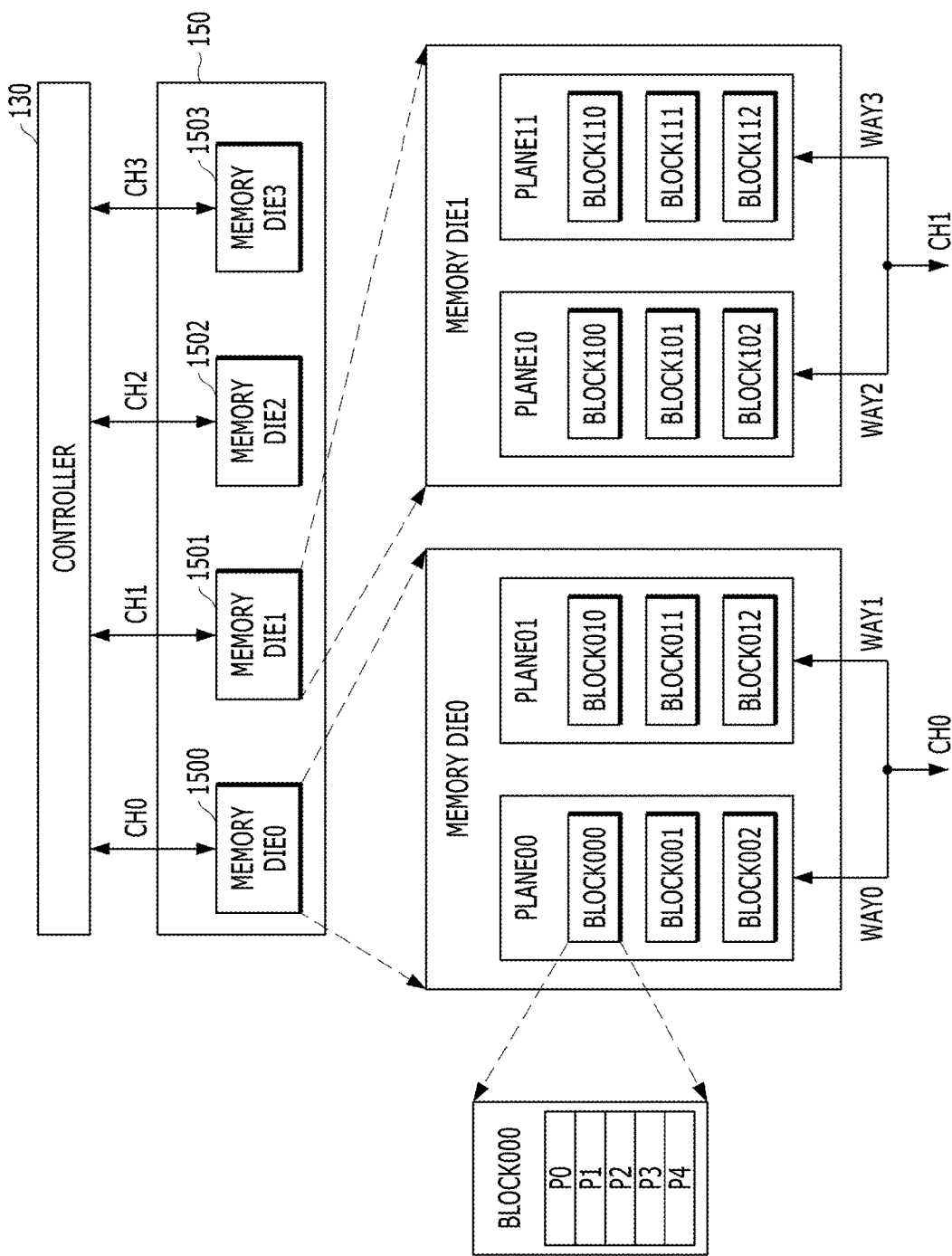
FIG. 2 is a diagram illustrating an example of a memory device included in the memory system in accordance with an embodiment.

FIG. 2 is a diagram illustrating an example of a memory device included in the memory system in accordance with the present embodiment.

Figure 3:
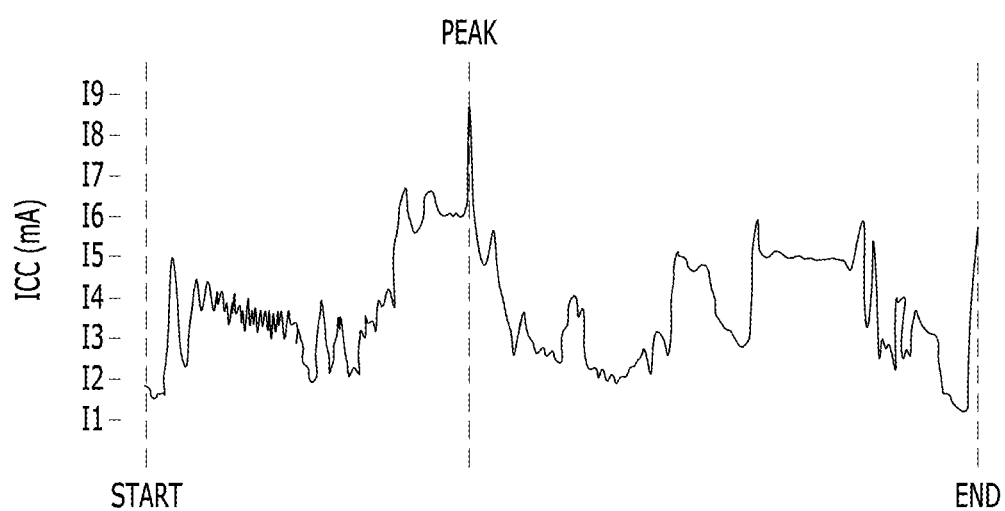
FIG. 3 is a diagram for describing a variation in power during a command operation performed by the memory device included in the memory system in accordance with an embodiment.

FIG. 3 is a diagram for describing a variation in power during a command operation performed by the memory device included in the memory system in accordance with the present embodiment.

First, referring to FIGS. 1A to 1C, the data processing system 100 may include a host 102 engaged or operably coupled with a memory system 110.

The host 102 may include, for example, any of a variety of portable or mobile electronic devices, such as a mobile phone (e.g., a smart phone), an MP3 player, or a laptop computer, and/or an electronic device, such as a desktop computer, a gaming device, a television (TV), a projector and so on.

The host 102 also includes at least one operating system (OS), which can generally manage and control functions and operations performed in or by the host 102. The OS may provide interoperability between the host 102 engaged with the memory system 110 and a user of the memory system 110. The OS may support functions and operations corresponding to the user's requests.

For example, the OS may include a general operating system and a mobile operating system, according to mobility of the host 102. The general operating system may be split into a personal operating system and an enterprise operating system, according to system requirements or a user's environment. The personal operating system (e.g., Windows OS and/or Chrome OS), may support services for general computing purposes. The enterprise operating systems (e.g., Windows servers, Linux and/or Unix) may be specialized for securing and supporting high performance computing operations.

Further, the mobile operating system may be an Android OS, iOS, and/or a Windows mobile OS. The mobile operating system may support services or functions for mobility or mobile computing (e.g., a power saving function). The host 102 may include a plurality of operating systems. The host 102 may execute multiple operating systems in cooperation with the memory system 110, corresponding to user requests. The host 102 may transmit a plurality of commands corresponding to the user requests into the memory system 110, thus performing operations corresponding to commands within the memory system 110.

The memory system 110 may perform a specific function or operation in response to a request received from the host 102 and, specifically, may store data to be accessed by the host 102. The memory system 110 may be used as a main memory system or an auxiliary memory system of the host 102. The memory system 110 may be implemented by various types of storage devices, which may be electrically coupled with or to the host 102, according to a protocol of am associated host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented as a volatile memory device, such as a dynamic random access memory (DRAM) or a static RAM (SRAM), and/or as a nonvolatile memory device, such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and/or a flash memory.

Referring to FIGS. 1A and 1B, the memory system 110 may include a memory device 150 for storing data accessed or accessible by a host 102 and a controller 130 for controlling data storage into the memory device 150. Referring to FIG. 1C, the memory system 110 may include the memory device 150 for storing data accessed by the host 102, the controller 130 for controlling data storage into the memory device 150, and an additional memory device 1101 for storing data used for internal operations of the controller 130.

The memory system 110 may be integrated to a single semiconductor device, which may be included in any of the various types of memory systems described herein.

For example, the memory system 110 may be integrated into a single semiconductor device. The memory system 110 may be integrated to form an SSD for improved operation speed. When the memory system 110 is used as an SSD, the operating speed of the host 102 connected to the memory system 110 is comparatively faster than when the host 102 is connected with a hard disk.

In another embodiment, the memory system 110 may be integrated into one semiconductor device to form a memory card, such as a PC card (PCMCIA), a compact flash card (CF), a smart media card (e.g., SM or SMC), a memory stick, a multimedia card (e.g., MMC, RS-MMC, MMCmicro), a secure digital (SD) card (e.g., SD, miniSD, microSD, SDHC), and/or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone or mobile device, a smart phone, an e-book, a portable multimedia player (PMP), a portable gaming device, a navigation system (e.g., GPS), a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a virtual reality (VR) or augmented reality (AR) system or device, storage configuring a data center, a device capable of transmitting and receiving information under a wireless environment, one of various electronic devices configuring a home network, one of various electronic devices configuring a computer network, one of various electronic devices configuring a vehicle computing network, one of various electronic devices configuring a telematics network, a radio frequency identification (RFID) device, and/or one of various components configuring other computing systems or devices.

Referring to FIGS. 1A to 1C and 2, the memory device 150 in the memory system 110 may be a nonvolatile memory device (e.g., a flash memory device) capable of retaining data stored therein, even when no power is supplied. The memory device 150 may store data provided from the host 102 as nonvolatile data therein through a write operation, and provide data stored therein to the host 102 through a read operation.

Specifically, the memory device 150 may include a plurality of memory dies 1500 to 1503. Each of the memory dies 1500 to 1503 may include a plurality of planes, such as PLANE00 and PLANE01 of memory die DIE0, and PLANE10 and PLANE11 of memory die DIE1. Furthermore, each of the planes, such as PLANE00 and PLANE01 of DIE0 and PLANE10 and PLANE11 of DIE1 may include a plurality of memory blocks, such as BLOCK000, BLOCK001 and BLOCK002 of PLANE00, BLOCK010, BLOCK011 and BLOCK012 of PLANE01, BLOCK100, BLOCK101 and BLOCK102 of PLANE10, and BLOCK110, BLOCK111 and BLOCK112 of PLANE11. Furthermore, each of the memory blocks, such as BLOCK000, BLOCK001 and BLOCK002 of PLANE00, BLOCK010, BLOCK011 and BLOCK012 of PLANE01, BLOCK100, BLOCK101 and BLOCK102 of PLANE10, and BLOCK110, BLOCK111 and BLOCK112 of PLANE11, may include a plurality of pages P0 to P4. Each of the pages P0 to P4 may include a plurality of memory cells (not illustrated).

For example, FIG. 2 shows the memory system 110 including one memory device 150. However, the memory system 110 may include multiple memory devices 150, such as two or four memory devices. Furthermore, FIG. 2 shows that one memory device 150 includes four memory dies 1500 to 1503. However, the memory device 150 may include various numbers or amounts of memory dies, such as two or eight memory dies. Furthermore, FIG. 2 shows that one memory die includes two planes. However, one memory die may include various numbers or amounts of planes, such as four or eight planes. Furthermore, FIG. 2 shows that one plane includes three memory blocks. However, one plane may include various numbers or amounts of memory blocks, such as three or more memory blocks. Furthermore, FIG. 2 shows that one memory block includes five pages (e.g., P0 to P4). However, one memory block may include various numbers or amounts of pages, such as a memory block that includes more than five pages.

The plurality of memory dies 1500 to 1503 included in the memory device 150 may be coupled to the controller 130 through a plurality of channels CH0 to CH3. For example, the zeroth memory die 1500 may be coupled to the controller 130 through the zeroth channel CH0. The first memory die 1501 may be coupled to the controller 130 through the first channel CH1. The second memory die 1502 may be coupled to the controller 130 through the second channel CH2. The third memory die 1503 may be coupled to the controller 130 through the third channel CH3.

For example, FIG. 2 shows that four memory dies 1500 to 1503 are coupled to the controller 130 through the four respective channels CH0 to CH3. However, the number or amount of memory dies may not be equal to the number of channels, and various numbers or amounts of memory dies, such as two or four memory dies, may be coupled to one channel. Thus, the number or amount of memory dies and channels within the memory device 150 can be changed according to a purpose of use and/or a performance requirement of the memory system 110.

When each of the memory dies 1500 to 1503 includes the plurality of planes (e.g., PLANE00 and PLANE01 or PLANE10 and PLANE11) and one memory die is coupled to one channel, each of the planes PLANE00 and PLANE01, and/or PLANE10 and PLANE11 may be coupled to a channel through a way. Referring to FIG. 2, the two planes PLANE00 and PLANE01 included in the zeroth memory die 1500 may be coupled to the zeroth channel CH0 through a zeroth way WAY0 and a first way WAY1, respectively. Similarly, the two planes PLANE10 and PLANE11 included in the first memory die 1501 may be coupled to the first channel CH1 through a second way WAY2 and a third way WAY3, respectively.

For example, FIG. 2 shows two ways are coupled to one channel, because two planes are included in one memory die. However, depending on how many planes are coupled to one channel, the number or amount of ways coupled to one channel may be adjusted or modified.

The plurality of memory dies 1500 to 1503 included in the memory device 150 may be different, separate or discrete modules, and coupled to the controller 130 through a plurality of data paths, such as the plurality of channels CH0 to CH3, which are also different, separate, or discrete from one another. When the plurality of memory dies 1500 to 1503 and the controller 130 exchange data through a plurality of data paths, the data exchange may indicate that data is exchanged between the plurality of memory dies 1500 to 1503 and the controller 130 via an interleaving operation. When data is exchanged through the interleaving operation using the plurality of data paths, an associated data transfer rate can be increased or greater than when data is exchanged through one data path.

Referring back to FIGS. 1A to 1C, the controller 130 in the memory system 110 controls the memory device 150 in response to a request received from the host 102. For example, the controller 130 provides the host 102 with data read from the memory device 150, and stores data provided from the host 102 in or to the memory device 150. To perform these operations, the controller 130 controls read, write, program, and erase operations of the memory device 150. In an embodiment, the controller 130 is a digital circuit that manages the flow of data going to and from the memory device 150. The controller may be formed on a chip independently or integrated with one or more other circuits.

Specifically, referring back to FIG. 1A, the controller 130 may include a host I/F (Interface) 132, a processor 134, an ECC (Error Correction Code) 138, a memory I/F 142 and a memory 144. Referring back to FIG. 1B, the controller 130 may include a host I/F 132, a processor 134, an ECC 138, a memory I/F 142, a memory 144 and an additional memory device 1301. Referring back to FIG. 1C, the controller 130 may include a host I/F 132, a processor 134, an ECC 138, a memory I/F 142, a memory 144 and an additional memory I/F 1302

Referring to FIGS. 1A to 1C, the host I/F (Interface) 132 in the controller 130 may process commands and data received from and provided by the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and/or integrated drive electronics (IDE). In accordance with an embodiment, the host interface 132 is a component for exchanging data with the host 102, which may be implemented through firmware called a host interface layer (HIL).

The ECC unit 138 may correct error bits of the data to be processed in (e.g., outputted from) the memory device 150, and may include an ECC encoder and an ECC decoder. Here, the ECC encoder may perform error correction encoding of data to be programmed in the memory device 150, to generate encoded data into which a parity bit is added and store the encoded data in the memory device 150. The ECC decoder may detect and correct errors contained in data read from the memory device 150 when the controller 130 reads the data stored in the memory device 150. In other words, after performing error correction decoding on the data read from the memory device 150, the ECC unit 138 may determine whether the error correction decoding has succeeded and output an instruction signal (e.g., a correction success signal or a correction fail signal). The ECC unit 138 may use the parity bit, which is generated during the ECC encoding process, for correcting the error bit of the read data. When the number of error bits is greater than or equal to a threshold number of correctable error bits, the ECC unit 138 may not correct error bits, but instead may output an error correction fail signal indicating failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC unit 138 may include any and all circuits, modules, systems or devices for performing the error correction operation based on at least one of the above described codes.

The memory interface 142 may serve as an interface for handling commands and data transferred between the controller 130 and the memory device 150, to allow the controller 130 to control the memory device 150 in response to a request delivered by and/or received from the host 102. The memory interface 142 may generate a control signal for the memory device 150 and may process data entered into or outputted from the memory device 150 under the control of the processor 134, such as when the memory device 150 is a flash memory (e.g., NAND flash memory).

The memory interface 142 may provide an interface for handling commands and data transmitted between the controller 130 and the memory device 150, such as a NAND flash interface that handles operations between the controller 130 and the memory device 150. In accordance with an embodiment, the memory interface 142 may be implemented through firmware called a flash interface layer (FIL) that acts as a component for exchanging data with the memory device 150.

Referring to FIG. 1C, the additional memory I/F 1302 may be a memory/storage interface between the controller 130 and the additional memory device 1101, which stores data used for an internal operation of the controller 130 in a device external to the controller 130. For example, the additional memory I/F 1302 may be a component or interface utilized when the additional memory device 1101 is located outside the controller 130, as illustrated in FIG. 1C. Therefore, when the additional memory device 1101 is not present (e.g., as illustrated in FIG. 1A) or the additional memory device 1301 is included in the controller 130 (e.g., as illustrated in FIG. 1B), the additional memory I/F 1302 may not be included in or part of the controller 130 (in contrast to the I/F 1302 as illustrated in FIG. 1C).

The memory 144 may support operations performed by the memory system 110 and the controller 130. The memory 144 may store temporary or transactional data generated for or delivered by operations in the memory system 110 and the controller 130. The controller 130 may control the memory device 150 in response to a request received from the host 102. The controller 130 may deliver data read from the memory device 150 to the host 102. The controller 130 may store data entered through and/or received from the host 102 within the memory device 150. The memory 144 may be used to store data utilized by the controller 130 and the memory device 150 to perform operations, such as read operations or program/write operations.

The memory 144 may store data for performing, operations, such as data writing and data reading operations requested by the host 102, and/or data transfer operations between the memory device 150 and the controller 130 for background operations, such as garbage collection and wear levelling, as described herein. In accordance with an embodiment, for supporting operations in the memory system 110, the memory 144 may include a program memory, a data memory, a write buffer/cache, a read buffer/cache, a data buffer/cache and a map buffer/cache.

In an embodiment, the memory 144 may store profile information. The profile information may include information that identifies, tracks, or represents changes in power consumption during operations performed with respect to memory dies of a memory device. For example, the profile information may include information on a change in power consumption for each of a plurality of operation sections included in each of a plurality of command operations, which may be performed in the plurality of memory dies 1500 to 1503 included in the memory device 150.

The memory 144 may be implemented as a volatile memory. For example, the memory 144 may be implemented as an SRAM (Static Random Access Memory) or DRAM (Dynamic Random Access Memory). Furthermore, as illustrated in FIGS. 1A to 1C, the memory 144 may be located inside or outside the controller 130. When the memory 144 is located outside the controller 130, data may be inputted to/outputted from the controller 130 through a separate memory I/F (not illustrated).

The processor 134 may be implemented with a microprocessor or a central processing unit (CPU). The memory system 110 may include one or more processors 134. The processor 134 may control the overall operations of the memory system 110. For example, the processor 134 can control a program operation or a read operation of the memory device 150 in response to a write request or a read request entered or received from the host 102.

In accordance with an embodiment, the processor 134 may use or execute firmware to control the overall operations of the memory system 110. As described herein, the firmware may be a flash translation layer (FTL). The FTL may serve as an interface between the host 102 and the memory device 150. The host 102 may transmit requests for write and/or read operations to the memory device 150 through the FTL.

The FTL may manage operations of address mapping, garbage collection, wear-leveling and so on. Specifically, the FTL may load, generate, update, and/or store map data. Therefore, the controller 130 may map a logical address, which is entered or received from the host 102, with a physical address of the memory device 150 through the map data. The memory device 150 may otherwise function as a general storage device to perform a read or write operation because of the address mapping operation. Further, as a result of the address mapping operation based on the map data, when the controller 130 attempts to update data stored in a particular page, the controller 130 may program the updated data on another empty page. The controller 130 may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested by the host 102 in the memory device 150, the controller 130 uses the processor 134. The processor 134, engaged with the memory device 150, may handle instructions or commands corresponding to or part of a command input by and received from the host 102. The controller 130 may perform a foreground operation as a command operation, corresponding to a command received from the host 102, such as a program operation corresponding to a write command, a read operation corresponding to a read command, an erase/discard operation corresponding to an erase/discard command, and/or a parameter set operation corresponding to a set parameter command or a set feature command with a set command.

As another example, the controller 130 may perform a background operation on the memory device 150 through the processor 134. For example, the background operation for the memory device 150 includes copying data in a memory block, among the plurality of memory blocks (e.g., BLOCK000, BLOCK001 and BLOCK002, BLOCK010, BLOCK011 and BLOCK012, BLOCK100, BLOCK101 and BLOCK102, and BLOCK110, BLOCK111 and BLOCK112), and storing such data in another memory block (e.g., a garbage collection (GC) operation).

The background operation may include an operation to move data stored in at least one of the plurality of memory blocks (e.g., BLOCK000, BLOCK001 and BLOCK002, BLOCK010, BLOCK011 and BLOCK012, BLOCK100, BLOCK101 and BLOCK102, and BLOCK110, BLOCK111 and BLOCK112) in the memory device 150 into at least another of the plurality of memory blocks, such as via a wear leveling (WL) operation.

During a background operation, the controller 130 may use the processor 134 to store the map data stored in the controller 130 to at least one of the plurality of memory blocks (e.g., BLOCK000, BLOCK001 and BLOCK002, BLOCK010, BLOCK011 and BLOCK012, BLOCK100, BLOCK101 and BLOCK102, and BLOCK110, BLOCK111 and BLOCK112), such as via a map flush operation. As another example, the controller 130 may perform a bad block management operation of checking for bad blocks among the plurality of memory blocks.

The processor 134 may include a management unit (not shown). The management unit may perform bad block management operations for the memory device 150. The management unit may find or identify bad memory blocks, such as blocks in unsatisfactory condition for further use, as well as perform bad block management operations on the identified bad memory blocks. For example, when the memory device 150 is a flash memory (e.g., a NAND flash memory), a program failure may occur during the write operation (e.g., during the program operation) due to characteristics of a NAND logic function. During the bad block management operations, the data of the program-failed memory block or the bad memory block may be programmed into a new memory block. The bad blocks can detrimentally or negatively effect the utilization efficiency of the memory device 150 having a 3D stack structure, and the reliability of the memory system 110. Thus, reliable bad block management may enhance or improve performance of the memory system 110.

As described herein, the memory system 110 is depicted in various configurations (e.g., the embodiments illustrated in FIGS. 1A to 1C), in order to illustrate how the memory system 110 manages and uses the profile information.

As described herein, the profile information may include information on or about a change in power consumption for operation sections included in or associated with command operations, which can be performed in the memory device 150.

For example, a manner in which operation sections are included in each of the command operations and how the profile information reflects, indicates, or tracks the change in power consumption for each of the operation sections is described as follows.

First, a command operation performed by the memory device 150 may include a plurality of sub operations. For example, a write operation performed by the memory device 150 may include multiple operations, such as an operation in which the controller 130 propagates data, an operation of storing the propagated data in a specific buffer within the memory device 150, and an operation of programming the data, stored in the specific buffer within the memory device 150, to a memory cell. Thus, various types of command operations may be performed by the memory device 150, and various types of sub operations may be included in each of the command operations.

Since a plurality of sub operations are included in a command operation performed by the memory device 150, power consumption used by the memory device 150 to perform the command operation may not be fixed to a constant specific value, but instead varied based on the operation sections or sub operations of the command operation. For example, FIG. 3 depicts the power consumption used for a command operation in the memory device 150 significantly varies from a time point START when the command operation is started to a time point END when the command operation is ended.

As described herein, the power used within an operation section for each of the plurality of command operations, which can be performed by the memory device 150, may vary between operation sections. Depending on the type of memory device 150 and the type of command, the range of variation in power may be changed or modified, and the point of time when peak power is used during the command operation may be changed. For example, a time point PEAK, when the peak power of a write operation is used from a time point START when the write operation starts to be performed in the memory device 150 may be different from a time point PEAK when the peak power of a read operation is used from a time point START when the read operation starts to be performed in the memory device 150, because the two operations are different operations.

Furthermore, a difference or delta between the minimum power and the peak power in the operation section in which the memory device 150 performs the write operation may be different from a difference or delta between the minimum power and the peak power in the operation section in which the memory device 150 performs the read operation, because the two operations are different operations. Similarly, when it is assumed that there are two types of memory devices fabricated through different designs and processes, the memory devices may use different types of commands, because the types of the memory devices are different and have different characteristics. Thus, when two different types of memory devices perform the same command (e.g., the same read command), a variation in power used in each of the memory devices may be different, and the time point that peak power is used in each of the memory devices during the command operation may be different, depending on the types of the memory devices.

Therefore, during a process of designing and fabricating the memory device 150 before the memory device 150 is included in the memory system 110 and actually used, the type and characteristic of the memory device 150 may be previously checked to sort operation sections included in command operations that can be performed by the memory device 150, and information on or about a change in power consumption for each of the sorted operation sections may be generated as the profile information.

By reference, "power" may be calculated by multiplying "voltage," "current," and "time." Since a command is described herein as being performed by the memory device 150, it follows that the "voltage" is not varied but retains a constant level while the command is performed. Furthermore, "time", when used as a variable for calculating "power," may indicate an operation section in which a command is performed. Therefore, the magnitude of "power" used in an operation section in which a command operation is performed may correspond to the magnitude of "current" used in the operation section in which the command operation is performed. Therefore, when the magnitude of a current ICC used for a command operation varies (see I1, I2, I3, . . . , I8, I9 in the graph illustrated in FIG. 3), the variation can indicate that the magnitude of the power used for the command operation also varies accordingly.

As described herein, the profile information on or about the plurality of command operations which can be performed by the memory device 150 may be previously stored in one or more memory dies, such as the plurality of memory dies 1500 to 1503 included in the memory device 150. For example, as illustrated in FIG. 1A, the profile information may be previously stored in the zeroth memory die 1500 of the memory device 150. In this case, the controller 130 may load the profile information from the zeroth memory die 1500 at the time point when the memory system 110 is booted, store the loaded profile information in a preset internal space of the memory system 110 (e.g., the memory 144 included therein), and then use the profile information.

Also, as described herein, the profile information on the plurality of command operations which can be performed by the memory device 150 may be previously stored in the additional nonvolatile memory devices 1301 or 1101 included in the memory system 110. For example, as illustrated in FIG. 1B, the profile information may be previously stored in the additional nonvolatile memory device 1301 included in the controller 130. Furthermore, as illustrated in FIG. 1C, the profile information may be previously stored in the additional nonvolatile memory device 1101, which is included in the memory system 110, but located outside the controller 130.

In these cases, the controller 130 may load the profile information from the additional nonvolatile memory device 1301 or 1101 at the time point when the memory system 110 is booted, store the loaded profile information in a preset internal space of the memory system 110 (e.g., the memory 144 included therein), and then use the profile information. By reference, the profile information stored in the additional nonvolatile memory device 1101, which is included in the memory system 110 but located outside the controller 130 (as illustrated in FIG. 1C), may be loaded to the memory 144 through the additional memory I/F 1302 included in the controller 130.

The memory device 150 may include the plurality of memory dies 1500 to 1503. The memory dies 1500 to 1503 are independently operated, and operation sections of the memory dies 1500 to 1503 may overlap each other through an interleaving method or process. In other words, when two or more command operations are sequentially performed through the interleaving method with two or more memory dies of the memory dies 1500 to 1503, the operation sections of the two or more command operations may overlap each other.

When it is expected, predicted, or determined that the operation sections of two or more command operations, which are sequentially performed, will overlap each other, the memory system 110 may determine or prioritize determination of whether peak power in a section in which the operation sections overlap each other exceeds power allowed or allotted for the memory device 150. The memory system 110 may determine whether power used by the memory device 150 to perform a command operation exceeds the allowed power (even for a moment or short duration) while the command operation is performed because the command operation cannot be performed normally or properly when the determined power exceeds the allowed power.

Therefore, when two or more commands are sequentially performed by the memory device 150, the interval between the time points that the two or more commands are performed should be set to a sufficient or suitable value, such that the peak power for each of the two or more command operations does not overlap each other. In some cases, when the interval between the two or more sequentially performed commands is set to an excessively large value, it may take a long time to process the two or more commands. On the other hand, in cases when the interval between the two or more sequentially performed commands is set to an excessively small value, the power used by the memory device 150 may unexpectedly exceed the power allowed for the memory device 150 in a section in which the operation sections of the two or more commands overlap each other.

Therefore, when two or more commands are sequentially performed by the memory device 150, the memory system 110, in accordance with the present embodiment, may determine, decide, or select an interval between the time points when the two or more commands are performed. The memory system 110 may utilize the profile information, including information identifying a change in power consumption for each of the plurality of operation sections included by each of the plurality of command operations that can be performed by the memory device 150, when determining, deciding, or selecting the interval between time points for performing the two or more commands. In doing so, the memory system 110 can avoid use or determination of a time interval that is excessively large or small.

Figure 4:
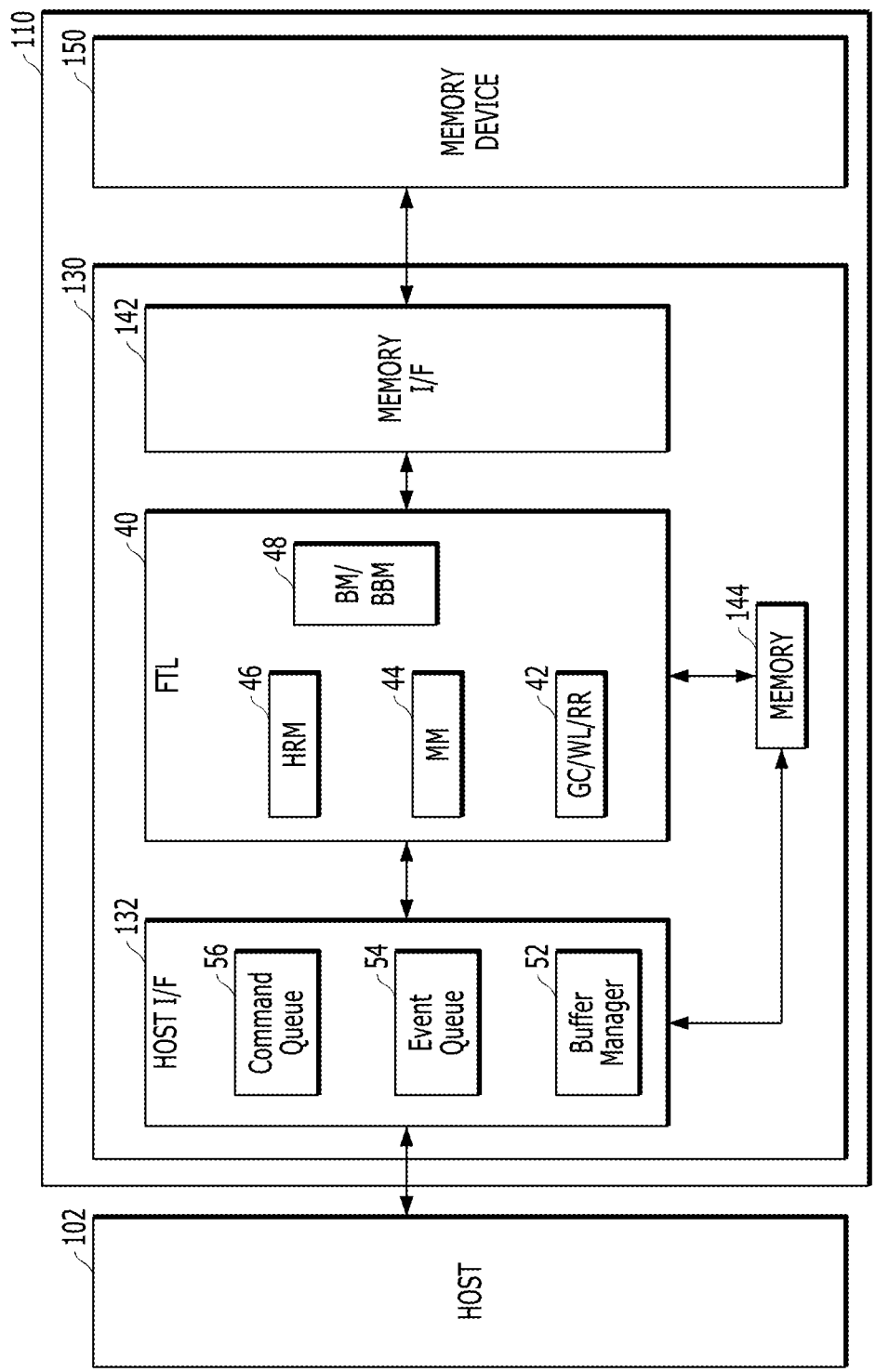
FIG. 4 is a diagram illustrating a controller within a memory system in accordance with an embodiment.

FIG. 4 is a diagram for describing a controller within a memory system in accordance with an embodiment.

Referring to FIG. 4, the memory system 110 may include a memory device 150 for storing data accessed by a host 102 and a controller 130 for controlling data storage into the memory device 150. The controller 130 may include a host I/F 132, an FTL (Flash Translation Layer) 40, a memory I/F 142 and a memory 144.

Although not shown in FIG. 4, in accordance with an embodiment, the ECC unit 138 in FIG. 1 may be included in the flash translation layer (FTL) unit 40. In another embodiment, the ECC unit 138 may be implemented as a separate module, a circuit, or firmware, which is included in, or associated with, the controller 130.

The host interface 132 handles commands and data from the host 102. For example, the host interface 132 may include a command queue 56, a buffer manager 52 and an event queue 54. The command queue 56 may sequentially store commands and data received from the host 102 and output the commands and data to the buffer manager 52 in a stored order. The buffer manager 52 may classify, manage, or adjust the commands and the data, which are delivered from the command queue 56. The event queue 54 may sequentially transmit events to process the commands and the data, received from the buffer manager 52.

A plurality of commands or data of the same characteristic may be continuously received from the host 102, or commands and data of different characteristics may be transmitted to the memory system 110 from the host 102 after being mixed or jumbled. For example, a plurality of commands for reading data (e.g., read commands) may be delivered, or read commands and program/write commands may be alternately transmitted to the memory system 110. The host interface 132 may store commands and data, which are received from the host 102, to the command queue 56 in a sequential order.

Then, the host interface 132 may estimate or predict what type of internal operation the controller 130 will perform according to the characteristics of the commands and data received from the host 102. The host interface 132 may determine a processing order and a priority of commands and data, based at least on these command and data characteristics. According to the characteristics of commands and data received from the host 102, the buffer manager 52 in the host interface 132 determines whether to store the commands and data in the memory 144, or to deliver the commands and the data into the flash translation layer (FTL) unit 40.

The event queue 54 receives events, entered or received from the buffer manager 52, which are to be internally executed and processed by the memory system 110 or the controller 130 in response to the commands and the data received from the host 102, in order to deliver the events into the flash translation layer (FTL) unit 40 in the order received from the host 102.

In accordance with an embodiment, the flash translation layer (FTL) unit 40 may include a state manager (GC/WL/RR) 42, a map manager (MM) 44, a host request manager (HRM) 46, and a block manager (BM/BBM) 48. The host request manager 46 may manage the events entered from the event queue 54. The map manager 44 may handle or control map data. The state manager 42 may perform garbage collection (GC) or wear leveling (WL) or read reclaim (RR) operations. The block manager 48 may execute commands or instructions onto a block in the memory device 150.

For example, the host request manager 46 may use the map manager 44 and the block manager 48 to handle or process requests according to the read and program commands, as well as events delivered from the host interface 132. The host request manager 46 may send an inquiry request to the map data manager 44 to determine a physical address corresponding to the logical address entered or received along with the events. The host request manager 46 may send a read request with the physical address to the memory interface 142, which processes the read request (e.g., handles the events). The host request manager 46 may also send a program request (or write request) to the block manager 48 to program entered or received data to an empty page (e.g., a page having no data) in the memory device 150. Then, the host request manager 46 may transmit a map update request corresponding to the program request to the map manager 44 to update an item relevant to the programmed data in information that maps the logical-physical addresses to each other.

The block manager 48 may convert a program request delivered from the host request manager 46, the map data manager 44, and/or the state manager 42 into a flash program request used for the memory device 150 to manage flash blocks in the memory device 150. In order to maximize or enhance the program or write performance of the memory system 110, the block manager 48 may collect program requests and send flash program requests for multiple-plane and one-shot program operations to the memory interface 142. The block manager 48 may send several flash program requests to the memory interface 142 to enhance or maximize parallel processing of a multi-channel and multi-directional flash controller.

The block manager 48 may be configured to manage blocks in the memory device 150 according to the number of valid pages, select and erase blocks having no valid pages when a free block is needed, and/or select a block including the least number of valid pages when it is determined that garbage collection is necessary. The state manager 42 may perform garbage collection to move the valid data to an empty block and erase remaining data in the blocks from which the valid data was moved, so that the block manager 48 may have enough free blocks (e.g., empty blocks with no data). If the block manager 48 provides information regarding a block to be erased to the state manager 42, the state manager 42 is able to check all flash pages of the block to be erased to determine whether each page is valid.

For example, to determine the validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache error occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is generated, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update, because the map request is issued with old physical information when the state manger 42 requests a map update and a valid page copy is not completed until a later time. In some cases, the map manager 44 may perform a map update operation to ensure accuracy of the mapping table only when the latest map table still points to the old physical address.

The read or write command transferred from the FTL 40 to the memory I/F 142 may be a command for a minimum read unit or a minimum write unit, which can be performed in the memory device 150. The minimum read unit or the minimum write unit may indicate a minimum size of data which can be read from or written to the memory device 150 through one read or write operation. Therefore, the minimum read unit or the minimum write unit may have a different value that depends on the type of the memory device 150. For example, when the memory device 150 is a NAND flash memory device, the minimum read unit or minimum write unit may correspond to a page.

The memory device 150 may include a plurality of memory blocks. Each of the plurality of memory blocks may be a single level cell (SLC) memory block or a multi-level cell (MLC) memory block, according to the number of bits that can be stored or represented in one memory cell of the block. The SLC memory block may include a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space, as compared to the SLC memory block.

The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block and various combinations. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment, the memory device 150 is embodied as a nonvolatile memory device or flash memory, such as a NAND flash memory, a NOR flash memory, and so on. In another embodiment, the memory device 150 may be implemented by at least one of a phase change random access memory (PCRAM), a ferroelectric random access memory (FRAM) and a spin injection magnetic memory (e.g., a spin transfer torque magnetic random access memory (STT-MRAM)).

Figure 5:
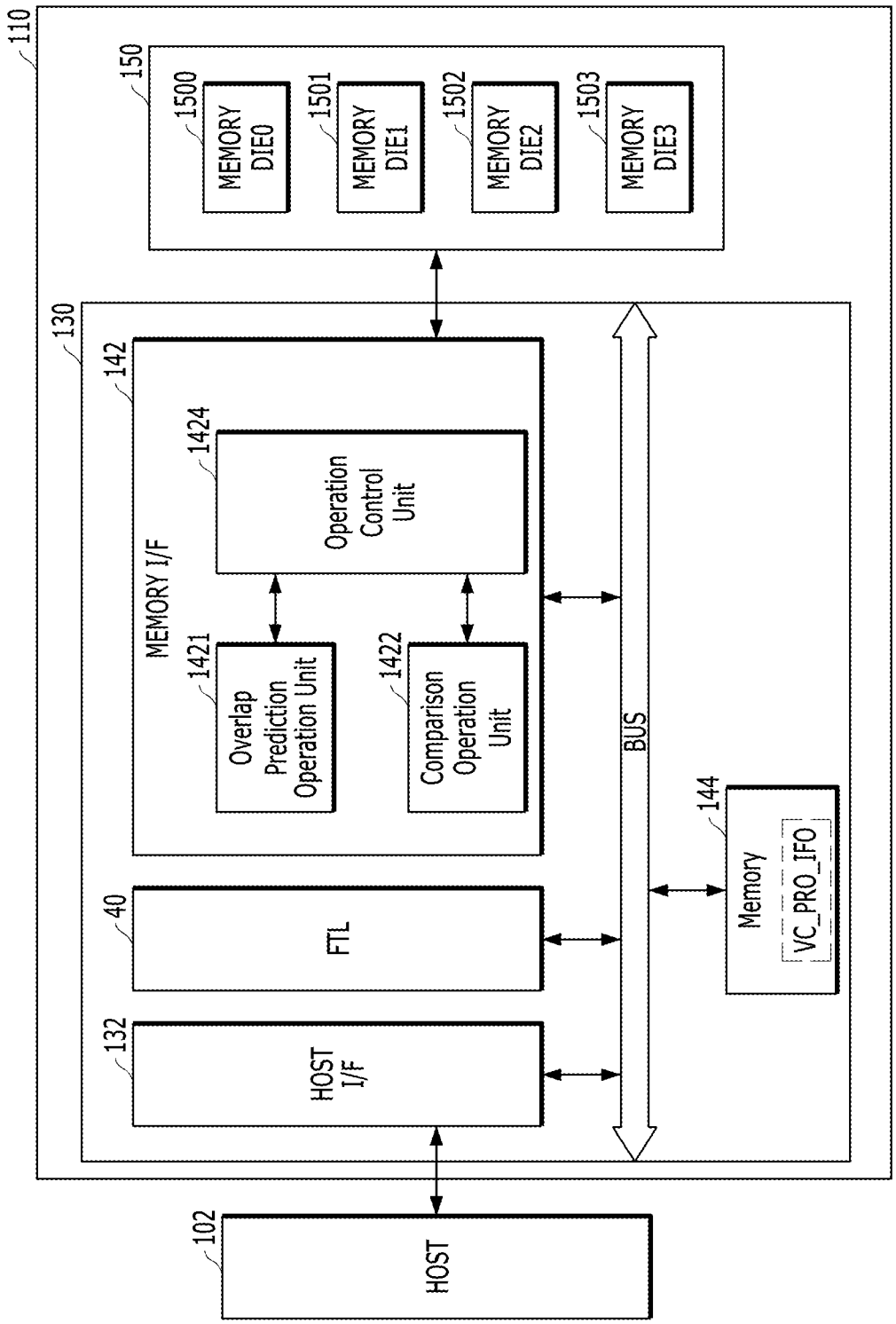
FIG. 5 is a diagram illustrating a memory I/F (Interface) included in a controller within a memory system in accordance with an embodiment.

FIG. 5 is a diagram illustrating a memory I/F included in a controller within a memory system in accordance with an embodiment.

Figure 6:
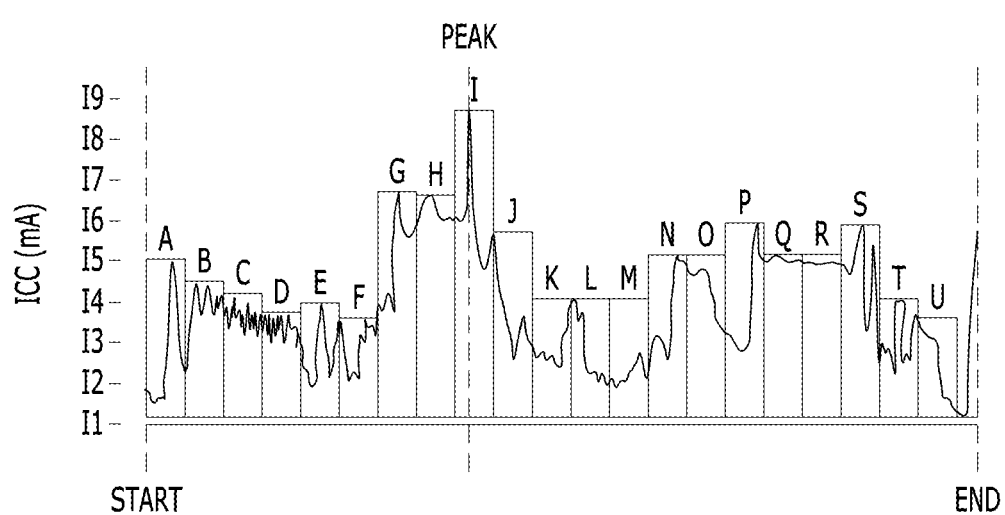
FIG. 6 is a diagram describing an example of profile information used in the memory system in accordance with an embodiment.

FIG. 6 is a diagram describing an example of profile information used in the memory system in accordance with the present embodiment.

Figure 7:
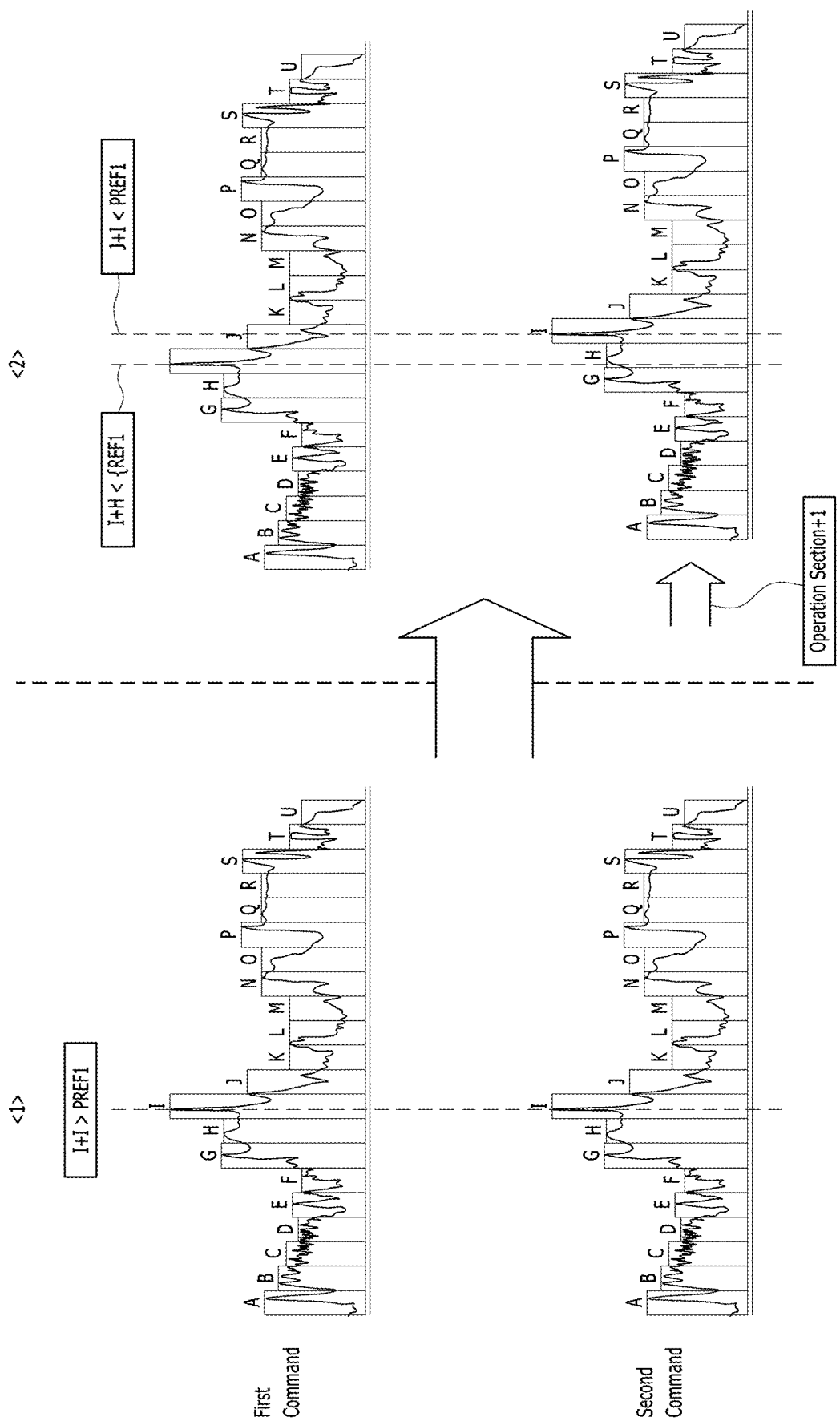
FIG. 7 is a diagram describing a first operation of the controller on a plurality of sequential commands.

FIG. 7 is a diagram describing a first operation of the controller on a plurality of sequential commands.

Figure 8:
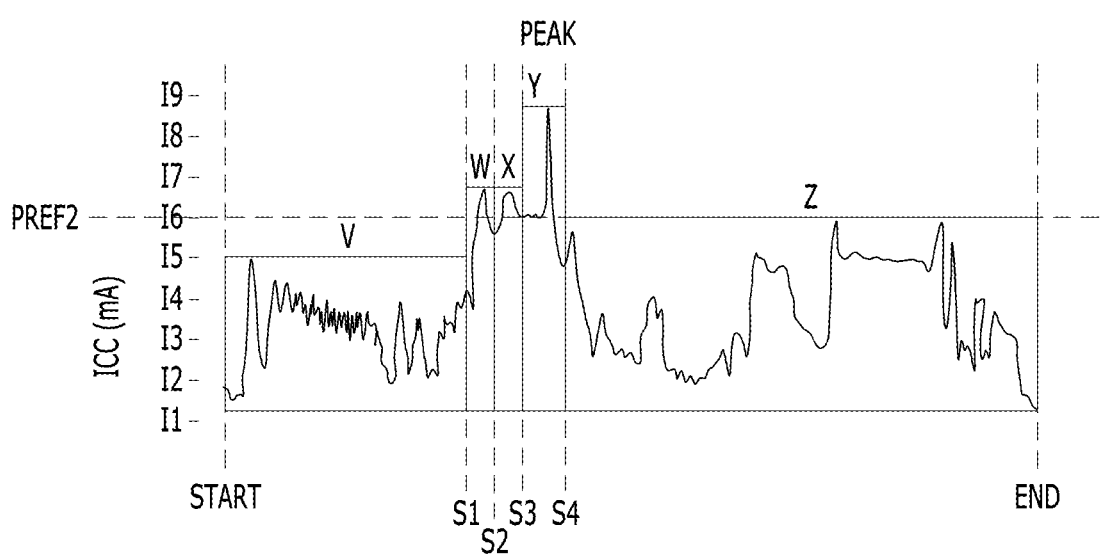
FIG. 8 is a diagram describing another example of profile information used in the memory system in accordance with an embodiment.

FIG. 8 is a diagram describing another example of profile information used in the memory system in accordance with the present embodiment.

FIG. 9 is a diagram describing a second operation of the controller on a plurality of sequential commands.

Referring to FIG. 5, the memory system 110 may include a memory device 150 for storing data accessed by a host 102 and a controller 130 for controlling data storage into the memory device 150, such as the memory system 110 described in FIG. 4. The controller 130 may include a host I/F 132, an FTL 40, a memory I/F 142 and a memory 144, similar to the controller 130 of FIG. 4. The memory device 150 may include a plurality of memory dies 1500 to 1503, similar to the memory device 150 described with reference to FIGS. 1 and 2.

Further, the memory I/F 142 may include an overlap prediction operation unit 1421, a comparison operation unit 1422 and an operation control unit 1424.

The host I/F 132, the FTL 40, memory 144, and the memory device 150 are described herein with respect to FIGS. 1 to 4. The memory I/F 142 will now be described in greater detail.

Referring to FIG. 5, the controller 130 may store profile information in a preset internal space of the controller 130, such as the memory 144. The profile information may include information on a change in power consumption for each of a plurality of operation sections included with each of a plurality of command operations that can be performed by the plurality of memory dies 1500 to 1503 of the memory device 150. When first and second commands are sequentially propagated to the plurality of memory dies 1500 to 1503 included in the memory device 150, the controller 130 may check a change in power consumption for each operation section for the first command and a change in power consumption for each operation section for the second command from the profile information stored in the memory 144 or other preset internal space.

Also, the controller 130 may calculate or determine the maximum length or duration of an overlap operation section, having a peak power that can be retained at a first reference power or less by referring to a result obtained by checking the change in power consumption for each operation section for each of the first and second commands. The overlap operation section can include an operation section where the operation section of the first command and the operation section of the second command overlap each other. Furthermore, the controller 130 may adjust a difference between the time points when the first and second commands are propagated to the memory device 150 (e.g., the time points when the first and second commands are actually performed in the memory device 150) according to the result obtained by calculating or determining the maximum length or duration of the overlap operation section in which the operation section of the first command and the operation section of the second command overlap each other. As described herein, the first reference power may indicate or identify the power allowed for the memory device 150.

Referring to FIG. 6, each of the plurality of command operations performed by the plurality of memory dies 1500 to 1503 included in the memory device 150 may be divided into a plurality of operation sections based on absolute time units, and the information on changes in power consumption for each of the operation sections may be generated and/or stored as profile information.

Specifically, during each of the plurality of command operations performed by the plurality of memory dies 1500 to 1503 included in the memory device 150, the power used in each of the operation sections may be varied, as described with reference to FIG. 3.

In an embodiment, as illustrated in FIG. 6, the interval between the start point START and the end point END of each of the plurality of command operations performed by the plurality of memory dies 1500 to 1503 included in the memory device 150 may be divided into a plurality of operation sections A, B, C, . . . , S, T and U, according to a preset fixed time interval.

Therefore, the profile information may include or represent information on changes in power consumption for or during each of the plurality of operation sections A, B, C, . . . , S, T and U. Further, the maximum power used in or during each of the plurality of operation sections A, B, C, . . . , S, T and U may be set or stored as a power consumption value for each of the plurality of operation sections A, B, C, . . . , S, T and U in the profile information.

For example, the profile information may include, represent, or indicate the maximum power of each of the operation sections (e.g., from operation section A to operation section U) in the form of a table or other data structure. As depicted in FIG. 6, the profile information indicates that the global peak power for all operation sections occurs in operation section I.

Referring to FIG. 8, each of the plurality of command operations performed by the plurality of memory dies 1500 to 1503 included in the memory device 150 may be divided into a plurality of operation sections according to a predetermined condition, and the information on changes in power consumption for each of the operation sections may be generated as profile information. The predetermined condition may indicate, for example, whether power used in or during an operation section has a larger value than a reference value.

Specifically, during each of the plurality of command operations performed by the plurality of memory dies 1500 to 1503 included in the memory device 150, the power used within each of the operation sections vary (e.g., not remain constant) as described with reference to FIG. 3.

In an embodiment, as illustrated in FIG. 8, each of the command operations may be divided into a plurality of operation sections V, W, X, Y and Z, based on a plurality of specific time points. The time points are selected according to whether the magnitude of power used between the start point START and the end point END of each of the plurality of command operations, is larger than a second reference power PREF2. For example, a first operation section may begin at the start point START and end at a first specific time point S1, when the magnitude of power used after the start point START of the operation section first exceeds the second reference power PREF2. Therefore, the first operation section, denoted as operation section V, has a time interval between the start point START and the first specific time point 51. The next operation section (e.g., operation section W) has an end time point positioned when the magnitude of power used after the first specific time point S1 becomes smaller than the second reference power PREF2, and then exceeds the second reference power PREF2, and is set to a second specific time point S2. Thus, a time interval between the first and second specific time points S1 and S2 may be set to the operation section W.

Similarly, the next operation section (e.g., operation section X) has an end time point positioned when the magnitude of power used after the second specific time point S2 becomes smaller than the second reference power PREF2 and then exceeds the second reference power PREF2, and is set to a third specific time point S3. Thus, a time interval between the second and third specific time points S2 and S3 may be set to the operation section X.

Also, the next operation section (e.g., operation section Y) has an end time point located when the magnitude of power used after the third specific time point S3 becomes smaller than the second reference power PREF2 and then exceeds the second reference power PREF2, and is set to a fourth specific time point S4. Thus, a time interval between the third and fourth specific time points S3 and S4 may be set to the operation section Y.

Finally, because the magnitude of power used until the end point END of the operation section after the fourth specific time point S4 does not exceed the second reference power PREF2, a time interval between the fourth specific time point S4 and the end point END may define and be set to the operation section Z. Thus, an operation section, as depicted in FIG. 8, may have a time interval defined by a duration via which a magnitude of power used after an initial time drops to a value lower than the second reference power PREF2 and then rises above the second reference power PREF2.

Therefore, the profile information may include information on a change or changes in power consumption for each of the operation sections V, W, X, Y and Z. The maximum power used in each of the plurality of operation sections V, W, X, Y and Z may be set as power consumption for each of the plurality of operation sections V, W, X, Y and Z in the profile information.

For example, the profile information may include the maximum powers for each of the operation sections (e.g., from the operation section V to the operation section Z) in the form of a table or other data structure. The profile information shows that the global peak power for all operation sections occurs in the operation section Y.

As described with reference to FIGS. 1A to 1C, the profile information may be previously generated during a process of designing and fabricating the memory device 150, such as before the memory device 150 is included in the memory system 110 and actually used, and stored in one or more memory dies (e.g., memory dies 1500 to 1503) included in the memory device 150 or stored in the additional nonvolatile memory device 1301 or 1101. In some cases, a designer may determine whether to generate the profile information in a form corresponding to the form depicted in FIG. 6 or 8. Thus, whether to generate the profile information in a form corresponding to the form depicted in FIG. 6 or 8 may be changed according to the designer's selection or input.

When performing a booting operation, the controller 130 included in the memory system 110 may load the profile information from one or more memory dies (e.g., memory dies 1500 to 1503, or the additional nonvolatile memory device 1301 or 1101) and store the loaded profile information in the preset internal space of the controller 130, such as the memory 144.

The controller 130 may perform an overlap prediction operation to vary the change in power consumption during each of the operation sections for each of the first and second commands. The changes to the power consumption may be checked through the profile information for each operation section. Through such an overlap prediction operation, the controller 130 may vary the number of overlap operation sections between the first and second commands. For example, the variation in the number or amount of overlap operation sections between the first and second commands may indicate that the length of the overlap operation section in which the operation sections of the first and second commands overlap each other is to be adjusted.

The controller 130 may perform a comparison operation of comparing one or more added powers, which correspond to one or more overlap operation sections between the first and second commands, to a first reference power PREF1. Through the comparison operation, the controller 130 may check whether there is an added power larger or greater than the first reference power PREF1.

Before sequentially propagating the first and second commands to the plurality of memory dies 1500 to 1503 included in the memory device 150, the controller 130 may alternately and/or repeatedly perform the overlap prediction operation and the comparison operation on the first and second commands until a preset condition is satisfied.

The controller 130 may start the overlap prediction operation and the comparison operation on the first and second commands when a maximum number of overlap operation sections are present between the first and second commands. At this time, it may be assumed that the state before the controller 130 starts the operation of alternately and/or repeatedly performing the overlap prediction operation and the comparison operation on the first and second commands (e.g., the state in which the controller 130 has never performed the overlap prediction operation and the comparison operation) is the state in which the maximum number of overlap operation sections are present between the first and second commands.

For example, performance of the first and second commands in the memory device 150 at the same time point is the state in which a maximum number of overlap operation sections are present between the first and second commands. As another example, when a difference between the time points when the first and second commands are performed in the memory device 150 is a minimum time difference designated by the specification of the memory device 150, the difference corresponds to the state in which the maximum number of overlap operation sections are present between the first and second commands.

Thus, when a maximum number of overlap operation sections are present between the first and second commands, the controller 130 may perform the comparison operation on each of the one or more overlap operation sections between the first and second commands, in order to check whether the preset condition is satisfied. The controller 130 may determine whether to perform the overlap prediction operation according to whether the preset condition is satisfied. Because the overlap prediction operation is performed while a maximum number of overlap operation sections are present between the first and second commands, the number of overlap operation sections between the first and second commands may decrease whenever the overlap prediction operation is performed. Thus, the controller 130 may alternately and repeatedly perform the comparison operation and the overlap prediction operation until the preset condition is satisfied as the result of the comparison operation.

The preset condition may include or be defined as a case in which the maximum power is smaller than the first reference power PREF1 in all of the one or more overlap operation sections, identified as the result obtained by performing the comparison operation on each of the one or more overlap operation sections between the first and second commands.

Therefore, when the preset condition is satisfied by performing the comparison operation, the length or duration of the overlap operation section may be maximized when the peak power used in the overlap operation section where the operation section of the first command and the operation section of the second command overlap each other can be maintained at the first reference power or lower power.

As described herein, the operation of varying the number of overlap operation sections and the operation of varying the length or duration of the overlap operation sections have been described in a similar manner. The operation of varying the number of overlap operation sections and the operation of varying the length or duration of the overlap operation sections are substantially the same operations. In other words, the operation of increasing the number of overlap operation sections may be the same or similar operation as the operation of increasing the length or duration of the overlap operation section. Similarly, the operation of decreasing the number of overlap operation sections may be the same or similar operation as the operation of decreasing the length or duration of the overlap operation section.

Therefore, the state in which a maximum number of overlap operation sections are present may be the same or similar state as the state in which the overlap operation section has the maximum length or duration.

Referring back to FIG. 5, when the first and second commands are sequentially propagated to the plurality of memory dies 1500 to 1503 included in the memory device 150, the operation control unit 1424 included in the memory I/F 142, among the components of the controller 130, may check changes in power consumption for each operation section for the first command and changes in power consumption for each operation section for the second command, using the profile information stored in the memory 144. Before the first and second commands are sequentially propagated to the plurality of memory dies 1500 to 1503 included in the memory device 150, the operation control unit 1424 may control the overlap prediction operation unit 1421 and the comparison operation unit 1422 to alternately and repeatedly perform the overlap prediction operation and the comparison operation on the first and second commands.

For example, the operation control unit 1424 may check whether the operation result determined by the comparison operation unit 1422 (e.g., the operation result of the comparison operation) satisfies the preset condition. Based on the check result, the operation control unit 1424 may control the overlap prediction operation unit 1421 and the comparison operation unit 1422 to alternately and repeatedly perform the overlap prediction operation and the comparison operation on the first and second commands. When the operation result determined by the comparison operation unit 1422 (e.g., the operation result of the comparison operation) satisfies the preset condition, the operation control unit 1424 may adjust a difference between the time points when the first and second commands are propagated to the plurality of memory dies 1500 to 1503, in response to the length or duration of the overlap operation section between the first and second commands in which the preset condition is satisfied.

When the overlap operation section between the first and second commands has a relatively large length when the operation result of the comparison operation satisfies the preset condition, the difference between the time points when the first and second commands are propagated to the plurality of memory dies 1500 to 1503 may decrease. On the other hand, when the overlap operation section between the first and second commands has a relatively small length when the operation result of the comparison operation satisfies the preset condition, the difference between the time points when the first and second commands are propagated to the plurality of memory dies 1500 to 1503 may increase.

The overlap prediction operation unit 1421 included in the memory I/F 142 may perform the overlap prediction operation of varying the change in power consumption for each operation section (for each of the first and second commands) on an operation section basis and under control of the operation control unit 1424. For example, the overlap prediction operation unit 1421 may vary the number of overlap operation sections between the first and second commands by performing the overlap prediction operation under control of the operation control unit 1424. Via the overlap prediction operation, the length or duration of the overlap operation section in which the operation sections of the first and second commands overlap each other may be adjusted or modified.

The comparison operation unit 1422 included in the memory I/F 142 (among the components of the controller 130) may compare one or more added powers corresponding to one or more overlap operation sections between the first and second commands to the first reference power PREF1 under control of the operation control unit 1424. For example, the comparison operation unit 1422 may check whether there is an added power larger or greater than the first reference power PREF1 by performing the comparison operation.

Referring to FIGS. 6 and 7 together as an embodiment, the first and second commands may be the same commands, and the plurality of operation sections included in the first command and the plurality of operation sections included in the second command are distinguished from one another according to their associated fixed time intervals, as described with reference to FIG. 6.

For example, it may be assumed that the first command includes twenty-one (21) operation sections A, B, C, ..., S, T and U and the second command includes twenty one (21) operation sections A, B, C, ..., S, T and U. Therefore, the profile information may include information on a change or changes in power consumption corresponding to each of the twenty-one operation sections A, B, C, ..., S, T and U included in the first command. Similarly, the profile information may include information on a change or changes in power consumption, corresponding to each of the twenty-one operation sections A, B, C, ..., S, T and U included in the second command.

Section <1> of FIG. 7 indicates the state in which a maximum number of overlap operation sections are present between the first and second commands. For example, it may be assumed that the first and second commands are performed at the same time point. Therefore, the twenty-one operation sections A, B, C, ..., S, T and U included in the first command and the twenty-one operation sections A, B, C, ..., S, T and U included in the second command may completely overlap each other, and the number of overlap operation sections between the first and second commands may therefore be twenty one sections.

When the number of overlap operation sections between the first and second commands is twenty-one sections, the controller 130 may perform the comparison operation. For example, the controller 130 may compare twenty-one added powers, corresponding to the twenty one overlap operation sections between the first and second commands to the first reference power PREF1. The controller 130 may compare a first added power, obtained by adding the maximum power of the operation section A of the first command and the maximum power of the operation section A of the second command, to the first reference power PREF1, and compare a second added power, obtained by adding the maximum power of the operation section B of the first command and the maximum power of the operation section B of the second command, to the first reference power PREF1. Thus, the controller 130 may compare all of the twenty-one added powers, obtained by adding the maximum powers of the operation sections A, B, C, ..., S, T and U of the first command and the maximum powers of the operation sections A, B, C, . . . , S, T and U of the second command, respectively, to the first reference power PREF1.

As depicted in section <1> of FIG. 7, the ninth added power I+I, obtained by adding the maximum power of the operation section I of the first command and the maximum power of the operation section I of the second command, is larger or greater than the first reference power PREF1 (e.g., I+I>PREF1). Therefore, in section <1> of FIG. 7, the result of the comparison operation for section I may not satisfy the preset condition.

Thus, the controller 130 may perform the overlap prediction operation to decrease the number of overlap operation sections between the first and second commands, compared to the state in which a maximum number of overlap operation sections are present between the first and second commands. For example, the controller 130 may shift the operation section of the second command by one operation section, via the overlap prediction operation, as illustrated in section <2> of FIG. 7. As depicted in section <2>, the first and second commands now have a difference, as a result of the shift, corresponding to one operation section. Therefore, the twenty-one operation sections A, B, C, . . . , S, T and U included in the first command and the twenty one operation sections A, B, C, . . . , S, T and U included in the second command may overlap each other with a difference corresponding to one operation section, and the number of overlap operation sections between the first and second commands may become twenty.

Now, after the shift and when the number of overlap operation sections between the first and second commands is twenty, the controller 130 may perform the comparison operation. For example, the controller 130 may compare twenty added powers corresponding to the twenty overlap operation sections between the first and second commands, respectively, to the first reference power PREF1. The controller 130 may compare a first added power, obtained by adding the maximum power of the operation section B of the first command and the maximum power of the operation section A of the second command, to the first reference power PREF1, and compare a second added power, obtained by adding the maximum power of the operation section C of the first command and the maximum power of the operation section B of the second command, to the first reference power PREF1. Thus, the controller 130 may compare the twenty added powers, obtained by adding the maximum powers of the operation sections B, C, D, . . . , S, T and U of the first command and the maximum powers of the operation sections A, B, C, . . . , R, S and T of the second command, respectively, to the first reference power PREF1.

In depicted in section <2> of FIG. 7, eighth added power (I+H), obtained by adding the maximum power of the operation section I of the first command and the maximum power of the operation section H of the second command, is smaller or lower than the first reference power PREF1 (e.g., I+H<PREF1). Also, the ninth added power (J+I), obtained by adding the maximum power of the operation section J of the first command and the maximum power of the operation section I of the second command, is smaller or lower than the first reference power PREF1 (e.g., 3+I<PREF1). Therefore, in section <2> of FIG. 7, the result of the comparison operation for the shifted sections may satisfy the preset condition.

When the result of the comparison operation satisfies the preset condition, the controller 130 may adjust a difference between the time points when the first and second commands are propagated to the plurality of memory dies 1500 to 1503, in response to the length or duration of the overlap operation section between the first and second commands in which the preset condition is satisfied. For example, when sequentially propagating the first and second commands to the plurality of memory dies 1500 to 1503, the controller 130 may control the difference between the time points when the first and second commands are propagated, such that the difference corresponds to the length or duration of one operation section. Therefore, a difference between the time points that the first and second commands are performed in the plurality of memory dies 1500 to 1503 may correspond to the length or duration of one operation section.

Referring to FIGS. 8 and 9 together as an embodiment, the first and second commands are the same commands, and the plurality of operation sections included in the first command and the plurality of operation sections included in the second command are distinguished from one another based on a plurality of specific time points that are selected according to whether the magnitude of power used between the start point START and the end point END of each of the command operations is larger than the second reference power PREF2, as described with reference to FIG. 8.

For example, five operation sections V, W, X, Y and Z are included in the first command, and five operation sections V, W, X, Y and Z are included in the second command. Therefore, the profile information may include information on a change or changes in power consumption, corresponding to each of the five operation sections V, W, X, Y and Z included in the first command. Similarly, the profile information may include information on a change or changes in power consumption, corresponding to each of the five operation sections V, W, X, Y and Z included in the second command.

As depicted, section <1> of FIG. 9 may indicate the state in which a maximum number of overlap operation sections are present between the first and second commands. For example, the first and second commands are performed at the same time point. Therefore, the five operation sections V, W, X, Y and Z included in the first command and the five operation sections V, W, X, Y and Z included in the second command may completely overlap each other, and the number of overlap operation sections between the first and second commands may be five (5) sections.

When the number of overlap operation sections between the first and second commands is five, the controller 130 may perform the comparison operation. For example, the controller 130 may compare five added powers corresponding to the five overlap operation sections between the first and second commands, respectively, to the first reference power PREF1. The controller 130 may compare a first added power, obtained by adding the maximum power of the operation section V of the first command and the maximum power of the operation section V of the second command, to the first reference power PREF1, and compare a second added power, obtained by adding the maximum power of the operation section W of the first command and the maximum power of the operation section W of the second command, to the first reference power PREF1. Thus, the controller 130 may compare all five added powers, obtained by adding the maximum powers of the operation sections V, W, X, Y and Z of the first command and the maximum powers of the operation sections V, W, X, Y and Z of the second command, respectively, to the first reference power PREF1.

In section <1> of FIG. 9, the fourth added power (Y+Y), obtained by adding the maximum power of the operation section Y of the first command and the maximum power of the operation section Y of the second command, is larger or greater than the first reference power PREF1 (e.g., Y+Y>PREF1). Therefore, in section <1> of FIG. 9, the result of the comparison operation for section Y may not satisfy the preset condition.

As described herein, the controller 130 may perform the overlap prediction operation to decrease the number of overlap operation sections between the first and second commands, as compared to the state in which a maximum number of overlap operation sections are present between the first and second commands. For example, the controller 130 may shift the operation section of the second command by one operation section, via the overlap prediction operation, as illustrated in section <2> of FIG. 9, such that the first and second commands have a difference corresponding to one operation section. As a result of the shift, the five operation sections V, W, X, Y and Z included in the first command and the five operation sections V, W, X, Y and Z included in the second command may now overlap each other with a difference corresponding to one operation section, and the number of overlap operation sections between the first and second commands may become four sections Further, the five operation sections V, W, X, Y and Z included in the first command and the five operation sections V, W, X, Y and Z included in the second command may have different lengths or durations with respect to one another (e.g., the length or duration of section V may be different than the length or duration of section W). Therefore, during the operation of shifting the operation sections of the second command by one operation section, a difference between the time points when the first and second commands are performed may be changed depending the operation sections shifted via the overlap prediction operation. For example, in section <2> of FIG. 9, one operation section shifted through the overlap prediction operation is the operation section Y. Therefore, after the overlap prediction operation, a difference between the time points when the first and second commands are performed may correspond to the length of the operation section Y.

When the number of overlap operation sections between the first and second commands is four, the controller 130 may perform the comparison operation. For example, the controller 130 may compare four added powers corresponding to the four overlap operation sections between the first and second commands, respectively, to the first reference power PREF1. The controller 130 may compare a first added power, obtained by adding the maximum power of the operation section W of the first command and the maximum power of the operation section V of the second command, to the first reference power PREF1, and compare a second added power, obtained by adding the maximum power of the operation section X of the first command and the maximum power of the operation section W of the second command, to the first reference power PREF1. Thus, the controller 130 may compare all four added powers, obtained by adding the maximum powers of the operation sections W, X, Y and Z of the first command and the maximum powers of the operation sections V, W, X and Y of the second command, respectively, to the first reference power PREF1.

As depicted in section <2> of FIG. 9, the third added power (Y+X), obtained by adding the maximum power of the operation section Y of the first command and the maximum power of the operation section X of the second command, is smaller or lower than the first reference power PREF1 (e.g., Y+X<PREF1). Also, the fourth added power (Z+Y), obtained by adding the maximum power of the operation section Z of the first command and the maximum power of the operation section Y of the second command, is smaller or lower than the first reference power PREF1 (e.g., Z+Y<PREF1). Therefore, in section <2> of FIG. 9, the result of the comparison operation for the shifted sections may satisfy the preset condition.

When the result of the comparison operation satisfies the preset condition, the controller 130 may adjust a difference between the time points when the first and second commands are propagated to the plurality of memory dies 1500 to 1503, in response to the length or duration of the overlap operation section between the first and second commands in which the preset condition is satisfied. For example, when sequentially propagating the first and second commands to the plurality of memory dies 1500 to 1503, the controller 130 may control the difference between the time points when the first and second commands are propagated, such that the difference corresponds to the length or duration of one operation section (e.g., the length of the operation section Y depicted in section <2> of FIG. 9. Therefore, a difference between the time points when the first and second commands are performed in the plurality of memory dies 1500 to 1503 may correspond to the length or duration of one operation section, such as the length or duration of the operation section Y depicted in section <2> of FIG. 9.

Although various embodiments have been described for illustrative purposes, it will be apparent to those skilled in the art that various changes and modifications may be made without departing from the spirit and scope of the invention as defined in the following claims.

What is claimed is:

1. A memory system, comprising:
a nonvolatile memory device including a plurality of memory dies that each perform a plurality of command operations in response to a plurality of commands; and
a controller, wherein the controller is configured to:
store, in a preset internal space of the controller, profile information for changes in power consumption for each of a plurality of operation sections included in each of the plurality of command operations;
check, from the profile information, the changes in power consumption for each operation section of a first command and a second command when sequentially propagating the first command and the second command to the plurality of memory dies;
calculate, based on the checked changes in power consumption for each operation section, a maximum length of an overlap operation section between the first command and the second command in which peak power is maintained at or below a first reference power for the nonvolatile memory device; and
adjust a difference between time points for performing the first command and the second command based on the calculated maximum length of the overlap operation section.

2. The memory system of claim 1, wherein the plurality of operation sections included in each of the plurality of command operations are selected based on fixed time intervals set between a start point and an end point for each of the plurality of command operations.

3. The memory system of claim 1, wherein the plurality of operation sections included in each of the plurality of command operations are selected based on a plurality of specific time points determined by comparing a magnitude of power, used between a start point and an end point of each of the plurality of command operations, to a second reference power.

4. The memory system of claim 1, wherein a maximum power used in each of the plurality of operation sections included in each of the plurality of command operations is set as power consumption for each operation section in the profile information.

5. The memory system of claim 1, wherein the controller adjusts a length of an overlap operation section between the first command and the second command by:
varying a number of overlap operation sections between the first command and the second command using an overlap prediction operation of varying changes in power consumption for each operation section of the first command and the second command; and
checking the changes in power consumption for each overlap operation section using the profile information stored in the preset internal space of the controller.

6. The memory system of claim 5, wherein the controller:
performs a comparison operation to compare one or more added powers for the one or more overlap operation sections between the first command and the second command to the first reference power; and
determines, based on the comparison operation, whether at least one of the added powers is greater than the first reference power.

7. The memory system of claim 6, wherein before sequentially propagating the first command and the second command to the plurality of memory dies, the controller alternately and repeatedly performs the overlap prediction operation and the comparison operation until a preset condition for the memory device is satisfied.

8. The memory system of claim 7, wherein the controller starts the overlap prediction operation and the comparison operation when a maximum number of overlap operation sections occur between the first command and the second command,
wherein the preset condition is based on a state of the memory device when no added power is greater than the first reference power.

9. The memory system of claim 1, wherein the profile information is stored in one or more memory dies of the plurality of memory dies; and
wherein the controller loads the profile information from the plurality of memory dies and stores the loaded profile information in the preset internal space during a booting operation of the memory system.

10. The memory system of claim 1, further comprising:
an additional nonvolatile memory device in which the profile information is stored,
wherein the controller loads the profile information from the additional nonvolatile memory device and stores the loaded profile information in the preset internal space, during a booting operation of the memory system.

11. A method of operating a memory system having a nonvolatile memory device including a plurality of memory dies suitable that perform a plurality of command operations in response to a plurality of commands, the method comprising:
storing, in a preset internal space of the memory system, profile information that identifies changes in power consumption for each of a plurality of operation sections included in each of the plurality of command operations;
checking, from the profile information, the changes in power consumption for each operation section of a first command and a second command, when the first command and the second command are sequentially propagated to the plurality of memory dies;
determining, from the changes in power consumption, a maximum length of an overlap operation section between the first command and the second command in which peak power is maintained at or lower than a first reference power of the nonvolatile memory device; and
adjusting a difference between time points of performing the first command and the second command are performed based on the determined maximum length of the overlap operation section.

12. The method of claim 11, wherein the plurality of operation sections included in each of the plurality of command operations are selected based on fixed time intervals set between a start point and an end point of each of the plurality of command operations.

13. The method of claim 11, wherein the plurality of operation sections included in each of the command operations are selected based on a plurality of specific time points determined by comparing a magnitude of power used between a start point and an end point of each of the plurality of command operations, to a second reference power.

14. The method of claim 11, wherein a maximum power used in each of the plurality of operation sections included in each of the plurality of command operations is set as power consumption for each operation section in the profile information.

15. The method of claim 11, further comprising:
adjusting a length of an overlap operation section between the first and second commands by:
varying a number of overlap operation sections between the first command and the second command using an overlap prediction operation of varying a change in power consumption for each operation section of each of the first command and the second command; and
checking the changes in power consumption for each overlap operation section using the profile information stored in the preset internal space of the controller.

16. The method of claim 15, further comprising:
performing a comparison operation to compare one or more added powers for the one or more overlap operation sections between the first command and the second command to the first reference power; and
determining, based on the comparison operation, whether at least one of the added powers is greater than the first reference power.

17. The method of claim 16, wherein the adjusting step comprises:
alternately and repeatedly performing the overlap prediction operation and the comparison operation until a preset condition for the memory device is satisfied, before sequentially propagating the first command and the second command to the plurality of memory dies; and
adjusting a difference between time points of performing the first command and the second command in response to alternately and repeatedly performing the overlap prediction operation and the comparison operation.

18. The method of claim 17, wherein the overlap prediction operation and the comparison operation start when a maximum number of overlap operation sections are present between the first command and the second command,
wherein the preset condition is based on a state of the memory device when no added power is greater than the first reference power.

19. The method of claim 11, wherein the profile information is stored in one or more memory dies of the plurality of memory dies, and wherein the method further comprises:

loading the profile information from the plurality of memory dies; and storing the loaded profile information in the preset internal space during a booting operation of the memory system.

20. The method of claim 11, wherein the memory system further comprises an additional nonvolatile memory device in which the profile information is stored, and wherein the operation method further comprises:

loading the profile information from the additional nonvolatile memory device; and storing the loaded profile information in the preset internal space during a booting operation of the memory system.

* * * * *